Figure 2:
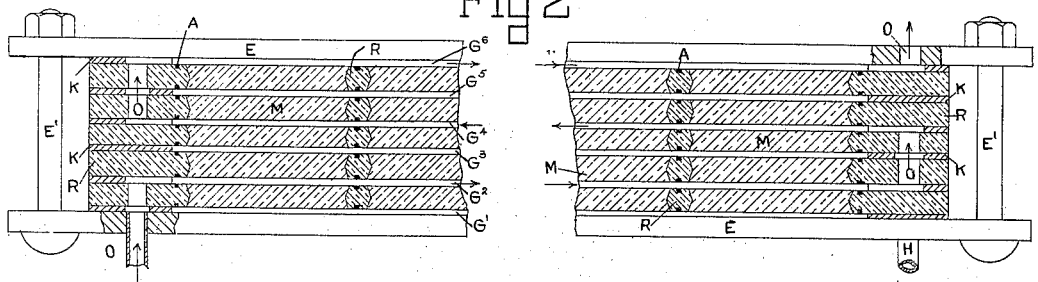

(No Model.) 3 Sheets—Sheet 1.

L. MOND & C. LANGER.
PROCESS OF OBTAINING ELECTRICITY FROM GAS BATTERIES.

No. 409,366. Patented Aug. 20, 1889.

Witnesses
S. R. Hollingsworth
Horace A. Dodge

Inventors
Ludwig Mond
Carl Langer,
by Dodge Sons
Attys.

(No Model.) 3 Sheets—Sheet 2.
L. MOND & C. LANGER.
PROCESS OF OBTAINING ELECTRICITY FROM GAS BATTERIES.
No. 409,366. Patented Aug. 20, 1889.
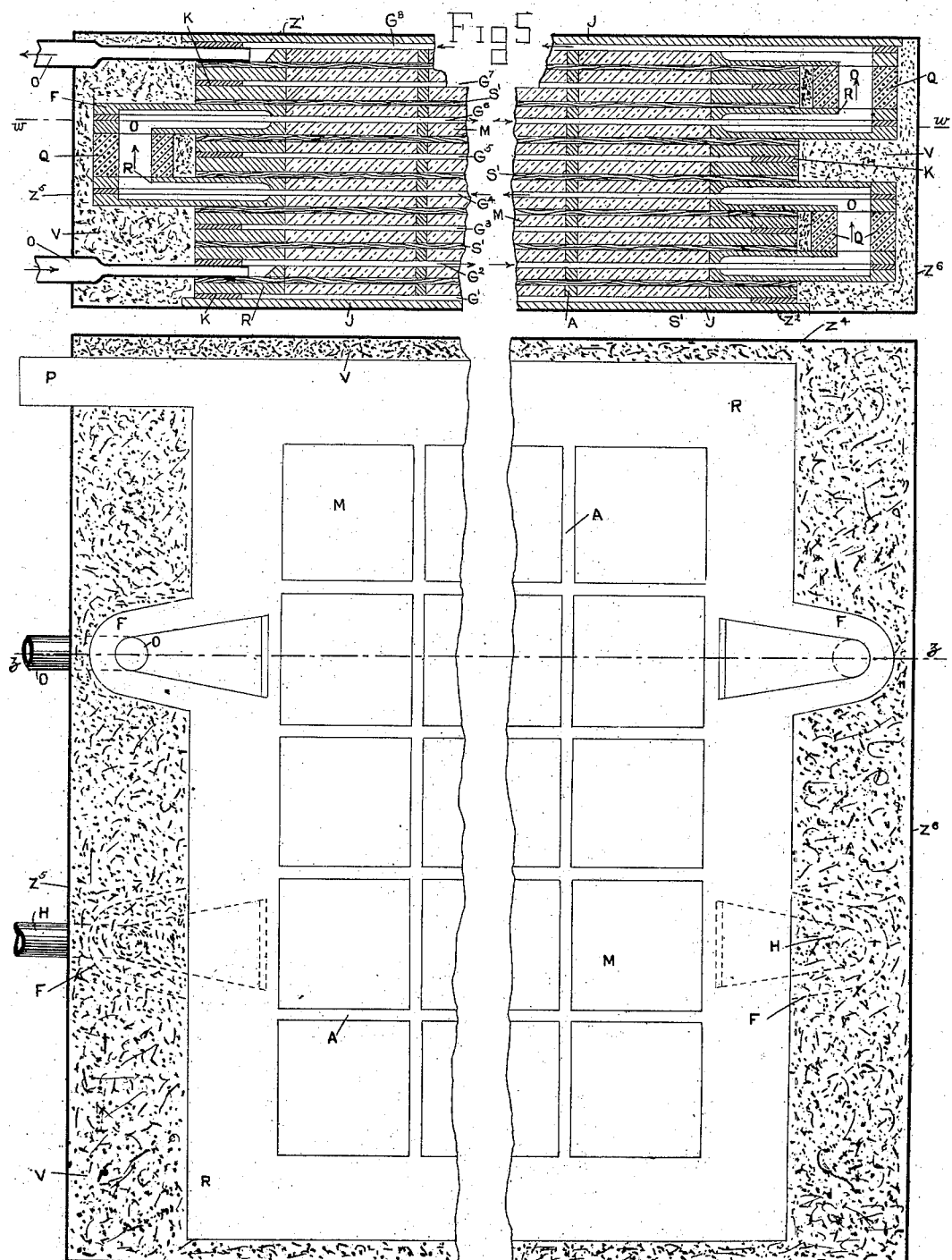

(No Model.) 3 Sheets—Sheet 3.
L. MOND & C. LANGER.
PROCESS OF OBTAINING ELECTRICITY FROM GAS BATTERIES.
No. 409,366. Patented Aug. 20, 1889.
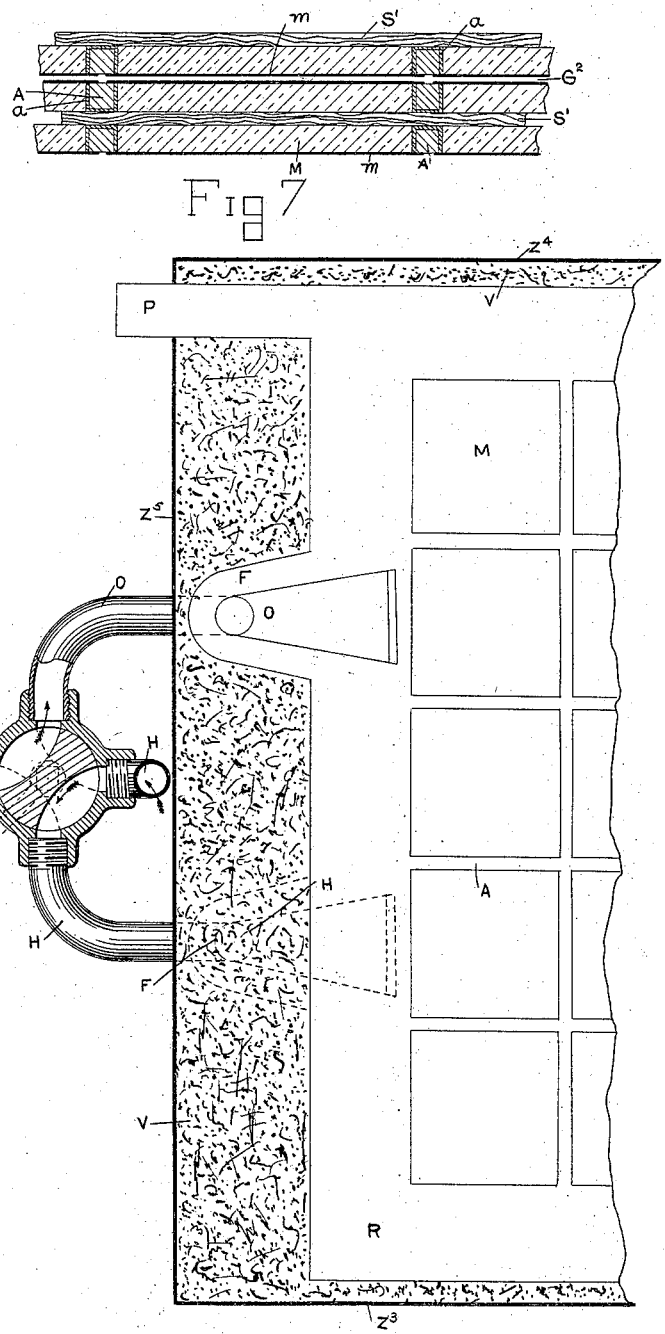

UNITED STATES PATENT OFFICE.

LUDWIG MOND, OF NORTHWICH, COUNTY OF CHESTER, AND CARL LANGER, OF LONDON, COUNTY OF MIDDLESEX, ENGLAND.

PROCESS OF OBTAINING ELECTRICITY FROM GAS-BATTERIES.

SPECIFICATION forming part of Letters Patent No. 409,366, dated August 20, 1889.

Application filed March 18, 1889. Serial No. 303,742. (No model.) Patented in England February 17, 1888, No. 2,411; in France October 5, 1888, No. 192,342; in Italy October 13, 1888, XXII, 23,943, XLVII, 225; in Luxemburg November 28, 1888, No. 1,058; in Turkey November 28, 1888, No. 130; in Belgium December 15, 1888, No. 84,102; in New South Wales January 2, 1889, No. 1,152; in Brazil February 1, 1889, No. 665, and in Spain February 12, 1889, No. 8,955.

*To all whom it may concern:*

Be it known that we, LUDWIG MOND, manufacturing chemist, of Winnington Hall, Northwich, in the county of Chester, and CARL LANGER, Ph. D., of South Hampstead, London, in the county of Middlesex, England, have invented certain new and useful Improvements in the Method of Obtaining Electricity from Gas, (for which we have received Letters Patent as follows, to wit: in Belgium, No. 84,102, December 15, 1888; in Brazil, No. 665, February 1, 1889; in England, No. 2,411, February 17, 1888; in France, No. 192,342, October 5, 1888; in Italy, XXII, 23,943, XLVII, 225, October 13, 1888; in Luxemburg, No. 1,058, November 28, 1888; in New South Wales, No. 1,152, January 2, 1889; in Spain, No. 8,955, February 12, 1889, and in Turkey, No. 130, November 28, 1888,) of which the following is a specification.

Gas-batteries have heretofore been made by bringing two gases capable of chemical action upon each other—such as hydrogen and oxygen—into contact with solid substances which have the power of absorbing or condensing these gases—such as platinum and carbon—and immersing these absorbing substances partly into a liquid electrolyte, which keeps the two gases separated. All these batteries have proved very ineffective and of no practical utility. In the earlier ones, in which the absorbing substance remained stationary in the liquid electrolyte, the acting surface was exceedingly small, and consequently the duty done by the battery was insignificant. In the later ones, in which the absorbing substance was alternately exposed to the gas and to the liquid electrolyte, by moving either the former or the latter the absorbing substances become covered by a film of liquid which almost destroys their power of absorbing gases. In order to overcome both these difficulties, we abandon the use of a simple liquid electrolyte and substitute for it a solid porous substance, which we impregnate by a liquid electrolyte, so that the absorbing substance coming into contact with it remains dry enough to retain its absorbing power for the gases to a sufficient degree. The porous substances used for this purpose must be non-conductors of electricity; they must be unalterable by the other substances with which they come in contact in the battery, and must be impermeable to gases after they have been impregnated with the electrolyte. A great many substances can be used for this purpose, among which we may name paper, pasteboard, infusorial earth, sand, asbestus, clay, leather, linen, flannel, &c. If dry powders are used, we inclose these between diaphragms or in a bag of parchment, paper, or other suitable substance. We have, however, found plates of porous earthenware and plates of plaster-of-paris to be the most handy. These porous substances we bring in contact with a substance or a mixture of several substances, which have the power of absorbing or condensing the gases to be employed. For this purpose the metals of the platinum group (platinum, palladium, iridium, osmium, rhodium, ruthenium,) more particularly in the form of a fine powder, such as platinum-black, are pre-eminently suitable, but other substances may be used, among which we may name finely-divided carbon. These absorbing substances are relatively bad conductors of electricity, and in order to reduce the internal resistance of the battery as far as possible we bring them into frequent contact with a good conductor to carry away the electricity formed. This conductor must be in intimate contact with the absorbing substance, but it must neither prevent the free access of the gas to it nor the contact of the absorbing substance with the electrolyte; and it must also be unalterable by the substances used or produced in the battery. We find very thin platinum, or gold foil or leaf perforated by very numerous and very small holes, or very fine platinum or gold-wire gauze, most suitable for this purpose. This metallic foil-leaf or gauze we apply over the whole surface of the absorbing substance, or we apply the foil-leaf or gauze to the surface of the porous substance, and put the absorbing substance on the outside of it in such a way that it fills up the holes or open spaces in the foil or gauze, and thus comes in contact with the porous substance; or we may put the absorbing substance on both sides of the foil or gauze, or coat the foil or gauze with platinum-black or its equivalent electrolitically. The metallic foil or gauze is connected by convenient means to the poles of the battery. We thus obtain plates or vessels, which are fixed in gas-tight chambers provided with proper means of egress and ingress for the gases to be employed. If gases are used in such a battery, such as hydrogen or oxygen, which by their chemical union produce a liquid, the action of the battery would gradually decrease on account of the liquid formed soaking the absorbing substance employed. To avoid this we employ one or both of the gases dry or hot, so that they are capable of evaporating and taking up the water or other liquid formed, and pass the gases through the battery in sufficient quantity to carry off in this way in the form of vapor all the liquid produced in the battery. The gases, after having been deprived of the vapor so taken up by drying or cooling, may be returned to the battery. When we employ hydrogen and atmospheric air, we find that all the water formed can be removed by simply passing an excess of air through the battery without previously drying or heating it, the heat produced in the battery itself assisting in carrying the water from it.

We will now proceed to describe several ways for carrying out our invention, reference being had to the accompanying drawings, in which—

Figure 3:
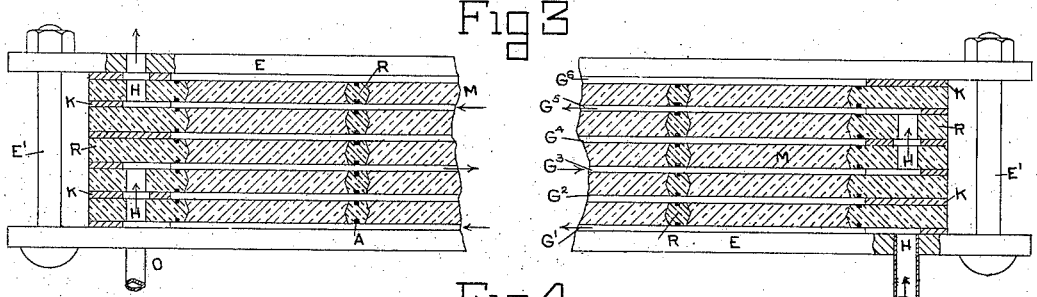
Figure 4:
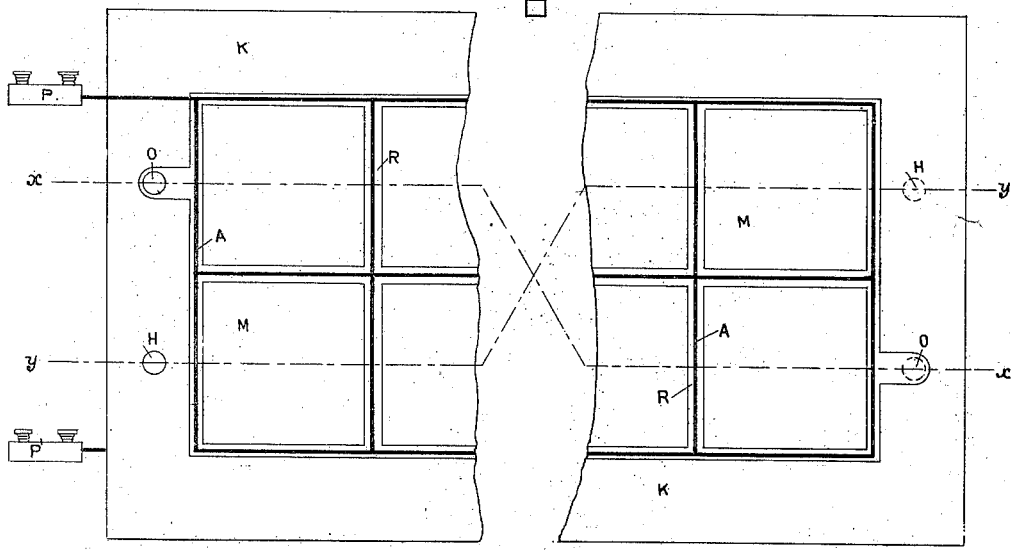
Figure 1:
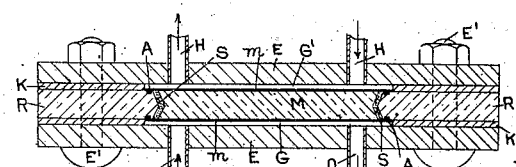

Figure 1 is a section of a very small battery consisting of a single plate, and illustrates the manner of constructing the plates. Figs. 2, 3, and 4 show a convenient form of construction for a battery of small or moderate size, Figs. 2 and 3 being, respectively, sections on lines $x\,x$ and $y\,y$, Fig. 4, and Fig. 4 being a plan with the top covering-plate removed. Figs. 5, 6, and 7 illustrate a convenient form of construction for a large battery, Fig. 5 being a section on line $z\,z$, Fig. 6, Fig. 6, a sectional plan on line $w\,w$, Fig. 5, and Fig. 7 an enlarged section of a portion of the battery, illustrating the method of forming the plates thereof; Fig. 8, a view of the battery shown in Figs. 5, 6, and 7, but with the addition of an appliance for use in changing the gas from time to time to counteract the polarization. Figs. 2 to 6, inclusive, and Fig. 8 are broken away in the center to avoid repetition in the drawings.

Referring to Figs. 1 to 4, for batteries of small or moderate size we fix the porous plates M, mentioned above, (say thin plates of earthenware or plaster-of-paris,) in a frame R, composed of a material non-conducting and impermeable to the gases, (such as ebonite,) by means of a suitable cement S, such as sealing-wax. This frame is provided on both sides, all round the porous plates, with narrow metallic conducting-strips A, which are joined to the poles P P' of the battery. We form these conducting-strips by providing the frame of ebonite all round the porous plates at a distance of about two millimeters from these plates with grooves, which we fill with an easily-fusible alloy, with a hard setting amalgam, or with metallic wires or strips fixed in these grooves. We employ the porous substance in small plates of square shape, of about three to five centimeters each side, and in case the surface of one porous plate is not sufficient to generate the required strength of current we cement several of them in the same frame of ebonite, as shown in Fig. 4. Then the porous plates are impregnated by a liquid electrolyte, (such as dilute sulphuric acid,) and afterward they are covered on both sides with platinum or gold-foil $m$, Fig. 1, which projects beyond the plate in such a way that it is in metallic connection with the conducting-strips A—that is to say, that the foil covers the strips. To insure that the metallic contact between the foil and the conducting-strips does not suffer from the oxidation of these latter, we coat the foil in the places where it covers the strips with fused paraffine or a suitable varnish. The very fine metallic foil used contains already many small pores or holes, and can be applied as it is, but it is advantageous to perforate it with a very large number of very small holes, which can easily be done by mechanical means. The metallic foil is put upon the porous plates, and made to adhere to them by gently rubbing over its surface, protected by a sheet of paper. Then the foil is covered with the absorbing substance, by preference with the platinum-black obtained by the reduction of chloride of platinum in dilute alkaline solution by means of formic acid. We find a quantity of two-tenths of a gram per square decimeter of surface to give a good result. This platinum-black we form into a paste with diluted sulphuric acid, and we apply this paste with a brush upon the metallic foil. Part of the platinum-black penetrates through the holes of the foil and is brought into contact with the porous plate, while part of it remains on the outside of the foil, where it is rapidly dried and kept dry by the gases passing through the battery, and consequently exerts upon the gases a very strong power of absorption. Between the plates thus prepared we place frames K, of india-rubber or of another suitable substance, of the same dimensions in breadth and length as the frames R of the ebonite, so as to form narrow and gas-tight chambers G, G', G², &c., between the frames of ebonite, which may be arranged one above the other, as in Figs. 2 and 3, or side by side in such a way that after pressing them together with end plates E E, of a stiff material, and screws E' we obtain between every two of the ebonite plates gas-tight chambers G', G², G³, &c. These chambers are put in communication with the gas-conducting tubes, and with one another by connections O H, which allow of hydrogen or its equivalent to be passed through the chambers G', G³, G⁵, &c., and air or its equivalent through the chambers G², G⁴, G⁶, &c. Each plate forms an element of the battery, which can be combined at will with the others.

Referring to Figs. 5, 6, and 7, for the construction of large batteries we cast frames of a suitable metal—for example, an alloy of lead and antimony—consisting of a broad edge R R, which form the inlets and outlets for the gases to the gas-chambers G', G², G³, &c., or we cut such frames from a metallic plate of a suitable metal. The places which later will be in contact with the electrolyte are covered with an insulating-layer $a$, Fig. 7, impermeable to and unattachable by the electrolyte—for example, a mixture of beeswax and resin or gutta-percha. Between two such frames we insert a thin sheet S', of porous material, prepared by coating a piece of canvas or paper or other suitable substance of the full size of the frames with plaster-of-paris, or its substitute, on both sides, and made impervious round the edges by impregnating it with a mixture of beeswax and resin, or other suitable insulating substance. We then fill the free spaces M in the squares formed by the conducting-strips with a porous substance, say plaster-of-paris, in such a way as to obtain a plate even on the outside. These plates are then covered with the conducting and absorbing substances $m$, Fig. 7, in the same way as before described, and are united in a battery with the interposition of frames K, of india-rubber, pasteboard, or other suitable substance, so as to form the gas-chambers G.

Fig. 5 shows a transverse section (on line $z\ z$, Fig. 6) of a battery of seven plates, and also the method of connecting the gas-chambers with each other. The communications between these chambers are made by cork or rubber washers or hollow cylinders Q. The first and last gas-chambers are formed by placing a plate J, of pasteboard or other non-conducting material, at each side of the battery. The whole battery is now placed between two metallic plates Z' Z², Fig. 5, say of zinc, which project a certain distance beyond the plates forming the battery. All the visible parts of the frames not covered by these two zinc plates Z' Z² are now well coated with a mixture of beeswax and resin or other suitable varnish, and the space V left between the two zinc plates is then filled up with plaster-of-paris, so as to obtain a solid block with even surfaces. After the plaster-of-paris has been allowed to set and dry we cover it with the zinc plates Z³ Z⁴ Z⁵ Z⁶ and solder all the zinc plates together, so as to obtain one solid compact block with no opening into it, except the exits and entrances O H, for the two gases.

The chemical action in the battery consists of the decomposition and new formation of the electrolyte. If we employ, for instance, dilute sulphuric acid, this will be decomposed into $H_2$ and $SO_4$. The hydrogen is carried by the current to the oxygen side, and there combines with it by the aid of the platinum-black under the formation of water. The $SO_4$ is carried toward the hydrogen side and combines with this again, forming sulphuric acid. By this action an increasing accumulation of the sulphuric acid on the hydrogen side takes place, and an accumulation of water on the oxygen side, which produces a polarization, causing a diminution of the electro-motive force of the battery. To counteract this polarization, we change the gases from time to time, (for instance, say once an hour,) so that the hydrogen is passed through the chambers previously filled with oxygen, and vice versa. By this means the sulphuric acid accumulated on one side of the element is gradually taken back and then accumulated on the other side, and so on. The changing of the gases can be carried out by any suitable means, either in one chamber at a time or through the whole battery at once, or the appliance shown in Fig. 8 may be employed, which, as will be seen, is simply a four-way cock. By moving the handle shown in dotted lines, so that the plug of the cock takes the position at right angles to that shown, the oxygen will then pass through the chambers through which the hydrogen has been passing, while the hydrogen will pass through those through which the oxygen has been passing.

These gas-batteries enable us to produce electricity at very low cost by using on the one side atmospheric air, on the other side the hydrogenic gases produced by the action of steam upon incandescent coke, anthracite, iron, &c., and by the imperfect combustion of coal, coke, or other carbonaceous substance by a mixture of air and steam. These gases, however, must be very carefully purified, and freed as much as possible from the carbon monoxide, which they may contain.

Even in using the hydrogen produced by the action of sulphuric acid upon zinc, our batteries offer special advantages over the hydro-electric batteries. We use atmospheric air as a depolarizer, and our battery is very compact, very clean, does not give out any smell, and is easily and quickly set in and out of action.

We do not limit ourselves to the details of the form and construction of the batteries which we have described, nor to the use of the gases and substances mentioned in this specification as being used in the construction and working of the batteries. It is evident that the form and construction of the batteries can be varied in a great many ways and that a very large number of different substances can be employed to attain our end.

No claim is made herein to the apparatus for carrying out the process, as that is set forth in an application filed by us, Serial No. 292,116.

Having thus described our invention, what we claim is—

1. The process of obtaining electricity by means of two gases—such as oxygen and hydrogen—which consists in causing said gases to each come in contact at or near ordinary temperatures with a layer of gas-absorbing material itself in contact with the electrolyte, the two layers of gas-absorbing materials being each insulated from the other of them and each of them connected with one of the poles of the battery, the two gases being interchanged periodically, substantially as described.

2. The process of obtaining electricity by means of a gas-battery, which consists in passing at or about ordinary atmospheric temperature combustible gas and air, respectively, over opposite sides of an electrolyte in contact on both sides with gas-absorbing materials, and collecting the electricity at innumerable points on each side, respectively, by conducting matter connected with opposite poles of the battery.

3. The improvements in the process of obtaining electricity by means of a gas-battery, which consists in passing such a quantity of air or dry gas through the apparatus as to carry off the water or other easily-evaporated liquid formed by the action of the battery.

4. The improvement in the process of obtaining electricity, as described, which consists in periodically interchanging the air and combustible gas so that each shall occupy the position previously occupied by the other, whereby the working-power of the electrolyte is restored and local action or polarization in great part prevented, substantially as described.

In testimony whereof we have signed our names to this specification in the presence of two subscribing witnesses.

LUDWIG MOND.
CARL LANGER.

Witnesses:
ALFRED J. BOULT,
HARRY B. BRIDGE.